May 19, 1970     K. A. WILSON     3,512,601
AUTOMATIC GUIDANCE SYSTEM FOR VEHICLES

Filed Nov. 2, 1967     7 Sheets-Sheet 1

INVENTOR.
KENNETH A. WILSON
BY
Barnes, Kisselle, Raisch & Choate
ATTORNEYS

May 19, 1970  K. A. WILSON  3,512,601
AUTOMATIC GUIDANCE SYSTEM FOR VEHICLES
Filed Nov. 2, 1967  7 Sheets-Sheet 2

INVENTOR.
KENNETH A. WILSON
BY
Barnes, Kisselle, Raisch & Choate
ATTORNEYS

INVENTOR.
KENNETH A. WILSON
BY
Barnes, Kisselle, Raisch & Choate
ATTORNEYS

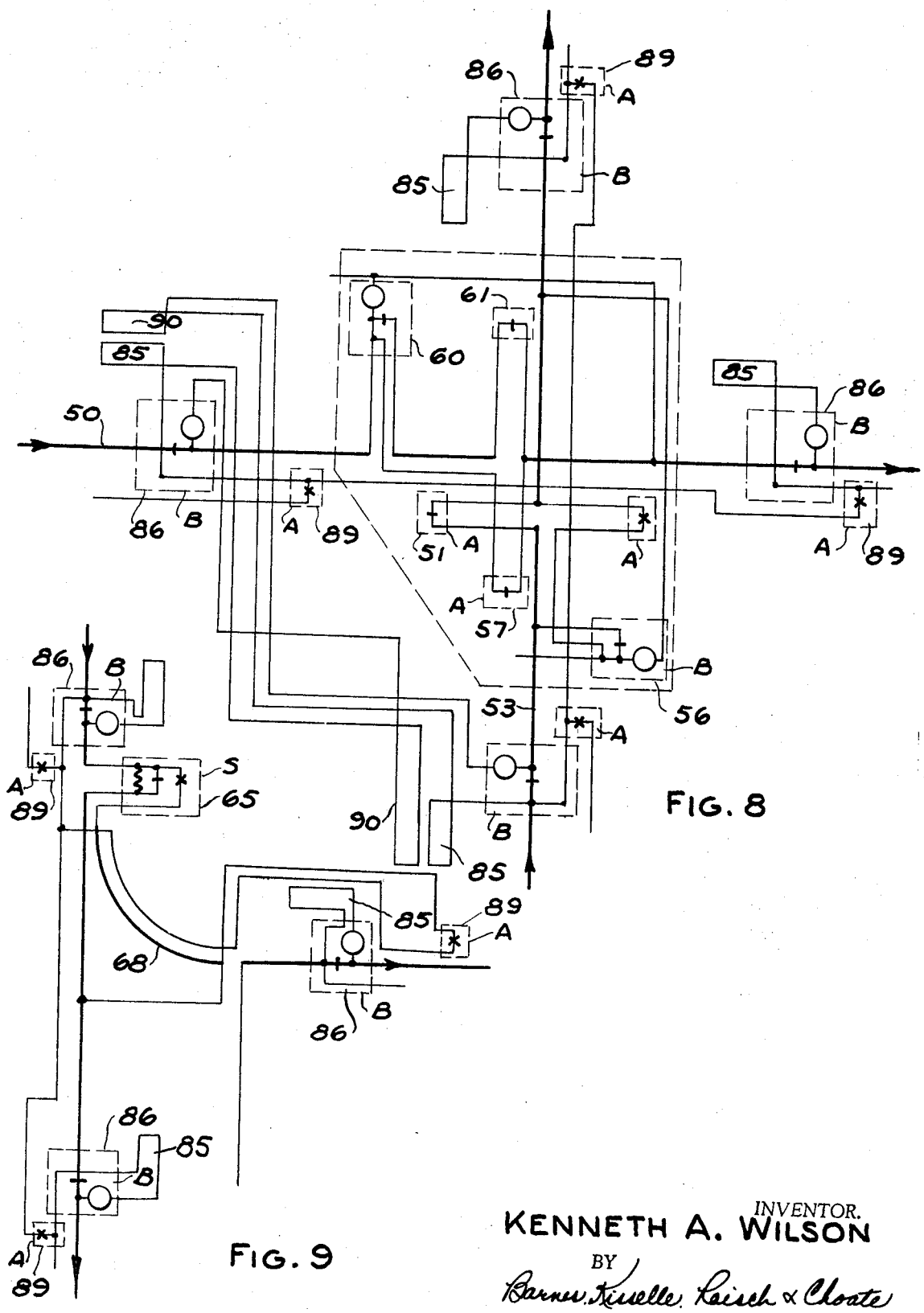

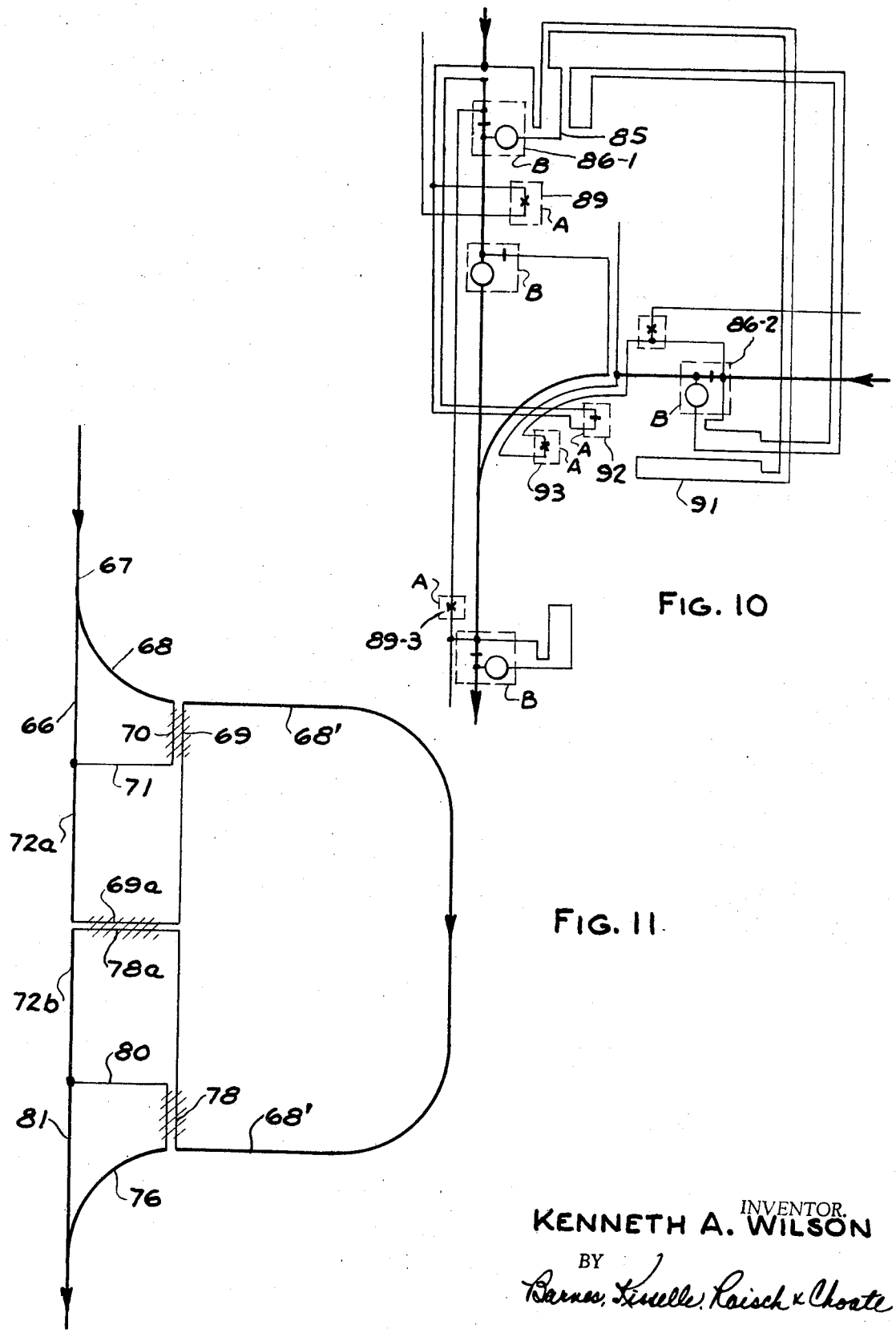

May 19, 1970   K. A. WILSON   3,512,601
AUTOMATIC GUIDANCE SYSTEM FOR VEHICLES
Filed Nov. 2, 1967   7 Sheets-Sheet 7
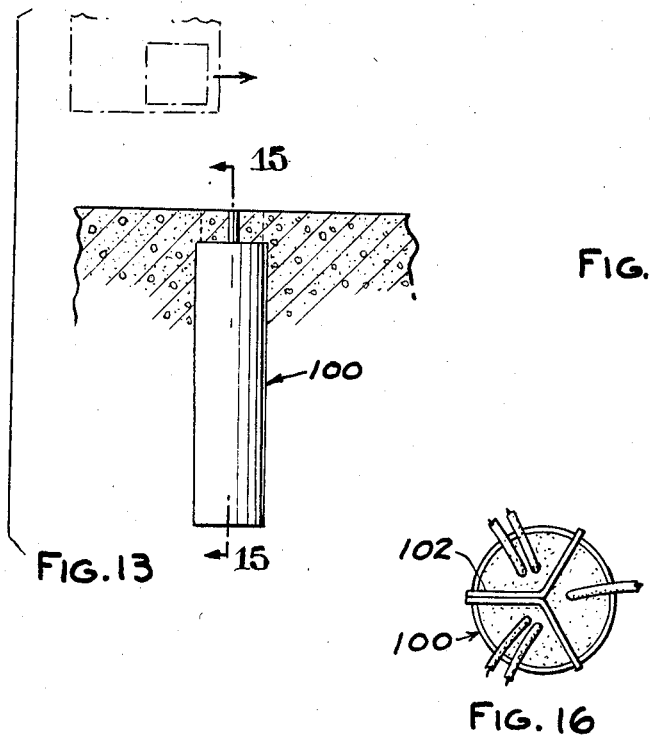
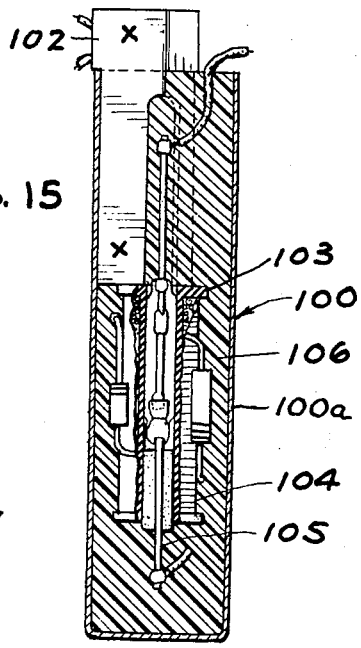
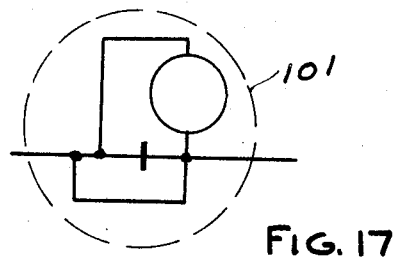
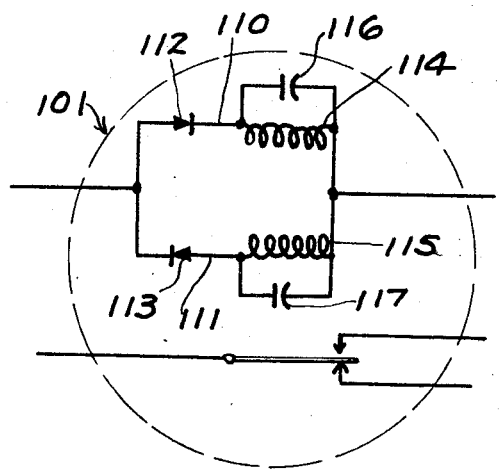
INVENTOR.
KENNETH A. WILSON
BY
Barnes, Kisselle, Raisch & Choate
ATTORNEYS United States Patent Office 3,512,601
Patented May 19, 1970

3,512,601
AUTOMATIC GUIDANCE SYSTEM FOR VEHICLES
Kenneth A. Wilson, Locust Valley, N.Y., assignor, by mesne assignments, to American Chain & Cable Company, Inc., New York, N.Y., a corporation of New York
Filed Nov. 2, 1967, Ser. No. 680,182
Int. Cl. B62d 5/04
U.S. Cl. 180—98
33 Claims

ABSTRACT OF THE DISCLOSURE

The guidance system disclosed herein comprises a guide path to be followed by the vehicle which is defined by a conductor or wire embedded in the floor. The conductor is connected to produce a single closed circuit energized by a constant current oscillator. The vehicle includes sensor means which senses the energized conductor and guides the vehicle along the path. The path may contain various decision points such as points at which portions of the conductor are brought into close proximity so that the vehicle must decide which path to follow, such as points where the paths intersect, diverge or converge. The guide path includes separately energizable portions at such decision points which are selectively energized upon signal from the vehicle so that only that portion is energized which lies along the direction in which it is desired that the vehicle travel. Where a plurality of vehicles are provided, provision is made for causing a leading vehicle to energize a holding loop at a point behind the leading vehicle which produces a signal that is received by a succeeding vehicle and causes the succeeding vehicle to be stopped until the leading vehicle has passed a predetermined point. Similar blocking devices are associated with the aforementioned decision points.

This invention relates to guidance systems and particularly to guidance systems for unmanned self-propelled vehicles such as tractors which are utilized in warehouses and the like for transporting loads from one destination to another.

BACKGROUND OF THE INVENTION

It has been well known that an unmanned self-propelled vehicle may be guided along a predetermined path defined by an energized conductor by sensing the position of the conductor and guiding the vehicle along the path defined by the conductor. Such a system is shown, for example, in the patent to Paulus et al. 2,317,400. In such systems, various decision points are provided as where the paths intersect, diverge or converge as well as when the vehicle reaches the desired destination. In the patent to De Liban 3,147,817, there is disclosed a system wherein the guide path is defined by conductors that are energized at two different frequencies at least at the decision points and the sensor on the vehicle is controlled or tuned at a decision point so that it is responsive only to one of the two frequencies. Obviously, such a system requires separate energizing sources for the various paths as well as accurately controlled sensor means. In the patent to Barrett 3,245,493, there is disclosed a system wherein at each decision point, there is a gap or space in the guide path and the steering mechanism of the vehicle is locked in a straight line by an internally generated signal so that the sensor that normally guides the vehicle is, in effect, bypassed at the decision point. Such a system is undesirable in that the movement of the vehicle is not being positively controlled while the vehicle is in this gap between conductor portions.

Among the objects of the present invention are to provide a guidance system which effectively controls the vehicle by selective energization of a single conductor closed circuit system at the decision points; which is relatively simple and requires a minimum of maintenance, which utilizes novel control devices; and wherein the control devices derive their energy from the guide path conductor.

SUMMARY

The guidance system disclosed herein comprises a guide path to be followed by the vehicle which is defined by a conductor or wire embedded in the floor. The conductor is connected to produce a single closed circuit energized by a constant current oscillator. The vehicle includes sensor means which follows the energized conductor and guides the vehicle along the path. The path may contain various decision points such as points at which portions of the conductor are brought into close proximity so that the vehicle must decide which path to follow, such as points where the paths intersect, diverge and converge. The guide path includes separately energizable portions at such decision points, controlled by guide path control devices, which are selectively energized upon signal from the vehicle so that only that portion is energized which lies along the direction in which it is desired that the vehicle travel. Where a plurality of vehicles are provided, provision is made for causing a leading vehicle to energize a holding loop at a point behind the leading vehicle which produces a signal that is received by a succeeding vehicle and causes the succeeding vehicle to be stopped until the leading vehicle has passed the predetermined point. Similar blocking devices are associated with the aforementioned decision points.

Some of the guide path control devices derive energy from the guide path conductor and incorporate a novel construction.

DESCRIPTION OF THE DRAWINGS

FIG. 8 is a schematic diagram of the intersection shown in FIG. 1 wherein a plurality of vehicles are used.

FIG. 9 is a schematic diagram of the diverging point shown in FIG. 1 when a plurality of vehicles are used.

FIG. 10 is a schematic diagram of the converging point shown in FIG. 1 when a plurality of vehicles are used.

FIG. 11 is a wiring diagram showing the manner in which the portion of the guide path containing the diverging and converging points is electrically connected.

FIG. 13 is a fragmentary side elevational view of a portion of a floor module in position.

FIG. 14 is a part sectional elevational view of the module shown in FIG. 13.

FIG. 15 is a part sectional elevational vew of another form of module.

FIG. 16 is a plan view of the same.

FIG. 17 is a schematic diagram of the same.
FIG. 18 is a wiring diagram of the same.

GENERAL DESCRIPTION

Figure 1:
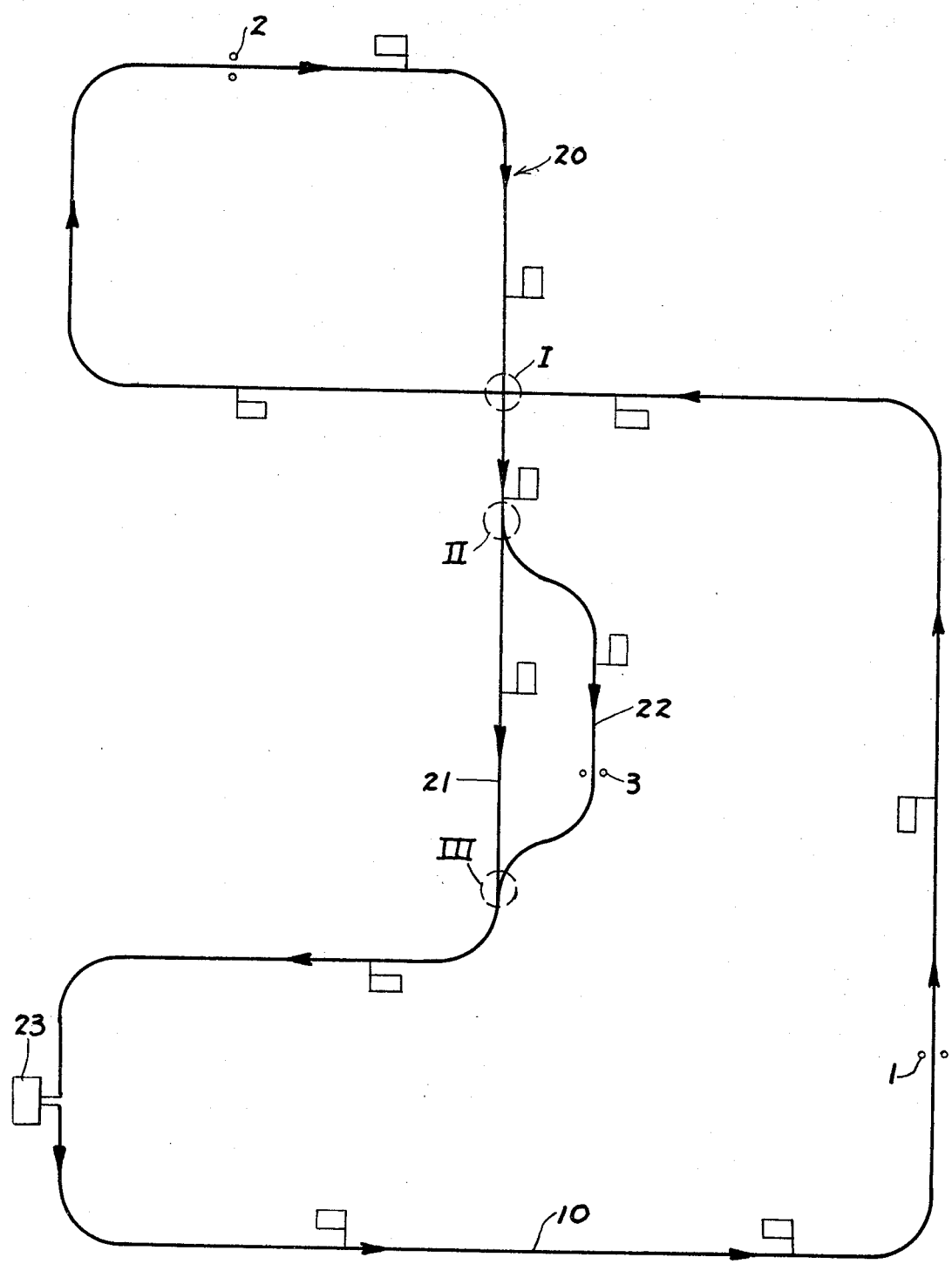
FIG. 1 is a diagram of a typical guide path embodying the guidance system of the present invention.

Referring to FIG. 1, the guide path 10 shown is utilized for controlling the movement of one or more vehicles such as tractors which may pull trailers between stations 1, 2 and 3. As shown, the guide path includes an intersection I, a diverging intersection II wherein the vehicle can move in one of two paths 21, 22, the latter extending to station 3, and a converging intersection III.

As will appear more clearly hereinafter, the guide path 20 is defined by a single circuit comprising conductors or wires embedded in the floor and so connected that at all times a single circuit is defined. The conductor is energized by a constant current oscillator, for example, at a frequency of 2 kc. and ⅛ amperes.

Figure 2:
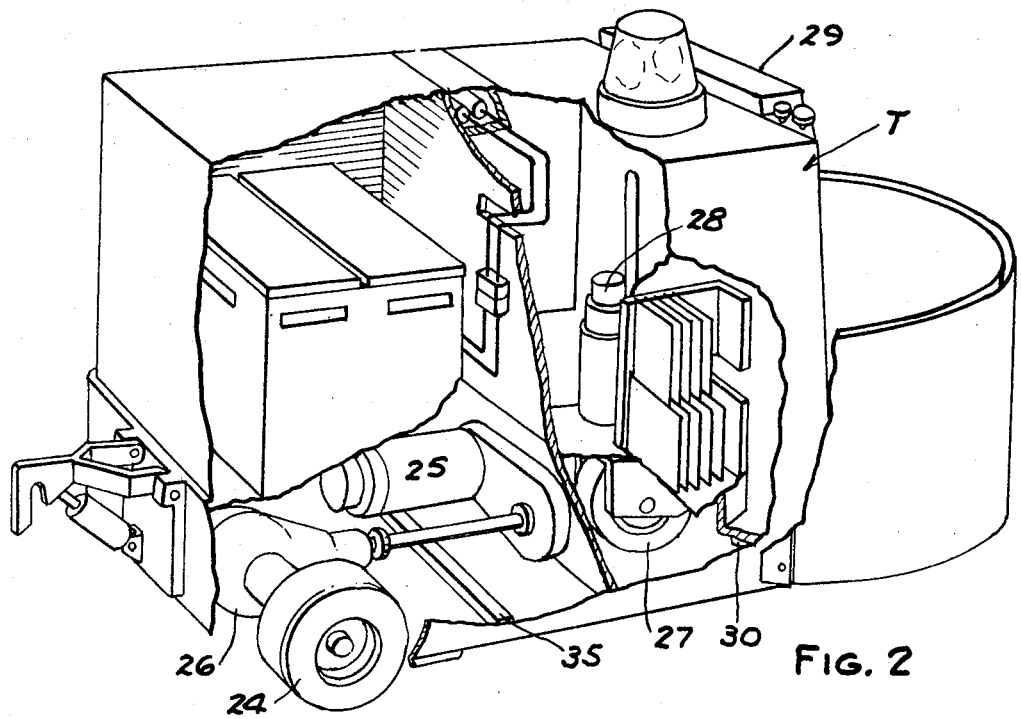
FIG. 2 is a partly diagrammatic fragmentary view of a vehicle utilized in the system.

Referring to FIG. 2, the vehicle T which may comprise a tractor is provided with rear drive wheels 24 that are driven by a motor 25 through a differential 26 and a front dirigible style steering wheel 27 that is steered by a steering motor 28. A control system is provided on the vehicle which senses readers along the guide path and produces an appropriate signal for selectively energizing portions of the guide path along which the vehicle is to pass, as more fully described hereinafter. The control system includes a programming selector or sensor 29 into which the operator places or selects a destination to which the vehicle is to be guided.

Figure 3:
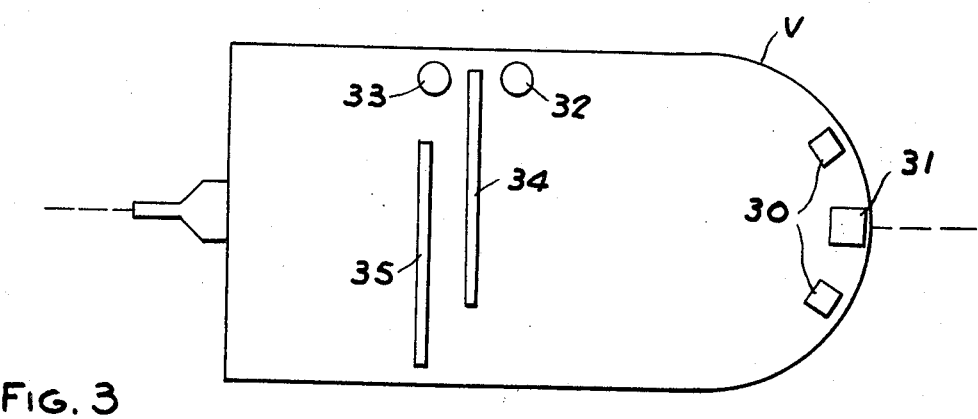
FIG. 3 is a diagrammatic plan view of a vehicle utilized in the system.

Referring to FIG. 3, the vehicle includes sensor means 30 which are utilized to control the steering motor 28 and steer the vehicle along the energized guide path as described, for example, in the patent to Hosking et al. 3,039,954, issued June 19, 1962. In addition, the vehicle has a permanent magnet 31 thereon which is utilized in the path control system and a selectively energizable electromagnet 32 which is also utilized in the path control system.

Further, the vehicle supports a signal device such as a pickup coil 33 that is utilized in controlling the movement of the vehicle and particularly in stopping the vehicle in the event that a leading vehicle is interrupted in its movement or is closer than a predetermined interval with respect to the succeeding vehicle.

In addition, selectively energizable sensing means in the form of two bars 34, 35 supporting sensing devices are provided for sensing or reading signals placed in predetermined positions along the path of the vehicle to produce guidance of the vehicle along the shortest path and to stop the vehicle at the predetermined destination.

GUIDE PATH CONTROL SYSTEM—SINGLE VEHICLE

Referring to FIG. 1, in areas of the guide path wherein the guide path intersects other paths or portions of the guide paths move into close proximity so that it is necessary to make a decision as to which path is to be followed by the vehicle, the path control is achieved by selectively energizing one of two portions at such points shown in FIG. 1 as I, II and III.

Figure 4:
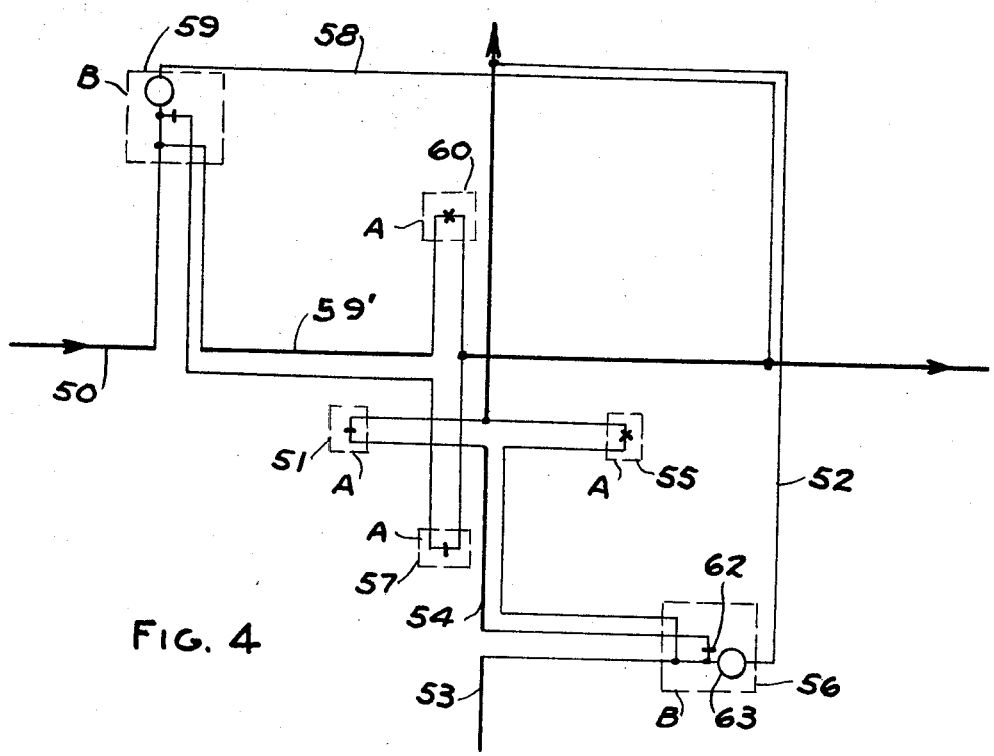
FIG. 4 is a schematic wiring diagram of the intersection shown in FIG. 1 when utilized for a single vehicle system.

Referring to FIG. 4, the manner in which the decision is made at points of intersection is shown schematically in FIG. 4. Thus, a vehicle approaching the intersection along path portion 50 defined by a conductor momentarily actuates a normally closed monostable device 51 that controls a bistable device 56 which energizes a portion 52 of the intersecting guide path 53 and de-energizes a portion 54. The bistable device 56 incorporates a holding circuit which maintains the portion 52 energized. Thus, as the vehicle approaches the intersection of paths 50 and 53, only path 50 is energized and the sensor means on the vehicle will thus cause the vehicle to follow along path 50. As the vehicle further moves and passes the intersection, a second normally open monostable device 55, in advance of conductor portion 52, returns the bistable device 56 to its original state to de-energize the bypass circuit 52 so that current will flow through the normal path 54. Similarly, when a vehicle approaches the intersection along path 53, a normally closed monostable device 57 is utilized to energize a bypass portion 58 and de-energize the principle portion 59' of the path 50. Specifically, monostable device 57 actuates a bistable device 59 in the bypass circuit 58 to energize the bypass circuit 58 until the vehicle has passed the intersection and momentarily energizes a normally open monostable device 60 which de-energizes the bistable device 59 to de-energize the circuit 58 and re-establish the flow of current across portion 59' of path 50.

The monostable devices 51, 55, 57 and 60 may comprise reed switches that are embedded along the path and in the floor and are actuated by a magnet on the vehicle such as a magnet 31 (FIG. 3). The bistable devices 56, 59 may comprise monostable reed switches with a holding circuit. As shown in the schematic diagram, FIG. 4, the bistable devices 56, 59 include a normally closed pair of contacts 62 which is electrically connected to complete a circuit between portions 53, 54 of the conductor. The bistable device further includes a holding circuit 63. When the monostable device 51 interrupts the current flow through the portions 54, current can only flow through the holding circuit 63 and thus maintains the contacts 62 in open position until the second monostable device 55, which is normally opened, is momentarily closed to short cross the holding circuit 63 and re-establish current flow between portions 53, 54 of the conductor. The second bistable device 59 is similarly connected.

Figure 5:
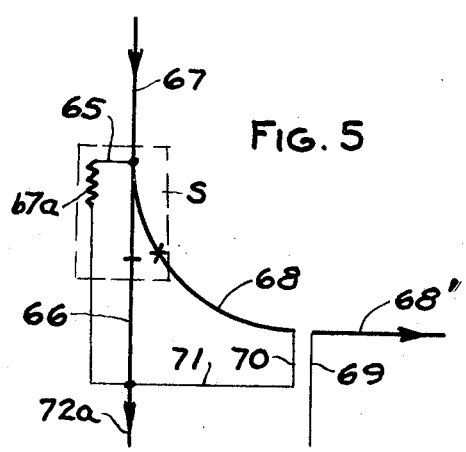
FIG. 5 is a schematic diagram of the point of divergence of the path shown in FIG. 1 when utilized for a single vehicle system.

The manner in which the conductor is selectively energized and wired in order to control the vehicle at a point of divergence such as shown at point II in FIG. 1 is shown in FIG. 5 wherein a bistable device 65 which is a two position device without a holding circuit is provided in the path of the vehicle and normally completes a circuit thereby energizing a portion 66 that extends in the normal path of the main portion 67 of the guide path. The bistable device 65 normally interrupts the flow of current to a second portion 68 of the conductor that is aligned and extends between the portion 67 in the direction and the portion 68' in the direction of the diverging path. Portion 68' is energized by a conductor portion 69 that is parallel to another portion 70, and the latter is interconnected to the portion 66 by a portion 71. It can be seen that the portions 69, 70 have current flow therein in opposite direction so that there is no net signal which would produce a steering signal to the vehicle. As the vehicle approaches the point of divergence, if the electromagnet 32 on the vehicle is properly energized as will occur when a decision is made by the path control system to cause the vehicle to diverge, the energized electromagnet 32 on the vehicle will actuate the bistable device 65 to break the circuit to the portion 66 and complete the circuit to the conductor portion 68 so that the vehicle will follow the energized conductor portion 68 in the diverging path. The bistable device 65 will remain in this position until it is again actuated by an opposite signal from the electromagnet 32 of a succeeding vehicle to return it to a condition for energizing conductor portion 66 so that the vehicle will follow in a normal path between portions 67 and 72a. A resistor 67a is provided in parallel with portions 66, 68 to maintain a load in the circuit during momentary switching and thereby obviate the possibility that the guide path might be momentarily open-circuited during switching.

Figure 6:
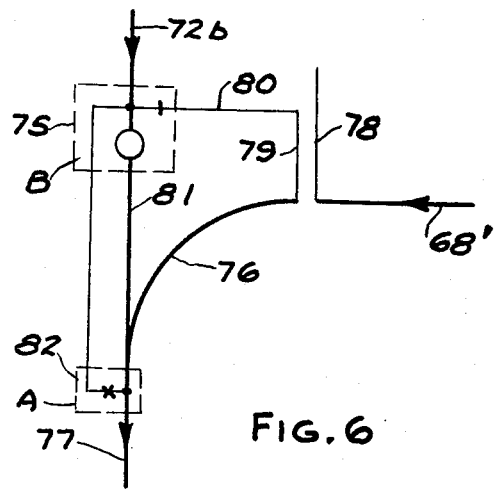
FIG. 6 is a schematic diagram of the point of convergence in the guide path shown in FIG. 1 when utilized for a single vehicle.

The manner in which the control of conductor path energization at a point such as the point of convergence III in FIG. 1 is shown schematically in FIG. 6 wherein the portion of the guide path 72 is electrically connected to a bistable device 75 of the aforementioned B type such that current normally flows through a guide path conductor portion 76 that extends from alignment with the bypass portion 68' and is electrically connected to a portion 77 aligned with the portion 72b. The bypass conductor portion 68 has a portion 78 extending parallel to interconnecting portion 79 so that no signal is normally produced in that area. If a vehicle is on the bypass conductor path 68 and approaches the point of divergence, it passes through to the main path 77.

If, however, a vehicle approaches along the path 72, the permanent magnet 31 on the vehicle actuates the bistable device 75 interrupting the flow to the portion 76 and permitting the flow of current to portion 81 so that the vehicle will pass along the main path to the portion 77. After the vehicle passes the point of convergence, a monostable device 82 that is normally open is momentarily closed to short circuit the holding circuit of the bistable device 75 and re-establish flow of current to the portion 76.

In the aforementioned description, the monostable devices of the simple switch type have been designated by the letter A, the monostable devices with a holding circuit have been designated by the letter B, and the bistable devices have been designated by the letter S.

In devices of the B type, the impedance of the holding circuit portion is made much greater than the impedance of the guide path portion. Thus, for example, in FIG. 6 the impedance of the holding portion is much greater than the impedance of the guide path portion 80–79–76 which is in parallel therewith. Thus, the two paths will divide the current in inverse proportion to their resistances. The current flow through path 81 is negligible compared to the current flow through path 79 and the radiating signal will be in the same proportion as the currents. When the device 75 of the B type is switched, the path 79 will be an open circuit and all the current will be forced to travel through the path 81. When the current is in the path 79, the power absorbed from the signal generator will be small compared to the power absorbed from the signal generator when the current is in path 81. Since in the system of the present invention the circuits normally maintain the B type modules in the de-energized position except when being traversed by a vehicle, only a few of the B type devices are "on" at any time so that the total energy absorbed by the B type devices is relatively low. Thus, it can be seen that in all cases the impedance of the path in parallel with the holding circuit is maintained at a low level.

It may be noted that in each of the figures, the arrows represent travel of the vehicle as well as instantaneous current flow.

FLOOR MODULES

As will be apparent, the monostable and bistable devices that are positioned in the floor are preferably in the form of encapsulated modules. In the schematic drawings heretofore shown, the modules have been also designated by the letters A, B and S. The module A in the preferred form comprises a monostable reed switch. The module B comprises a monostable reed switch with a holding circuit. The module S comprises a bistable reed switch.

Referring more specifically to FIGS. 13 and 14, the module A comprises a casing 100 in which a subassembly is positioned. The subassembly comprises angularly related armature plates 102 which are fixed by an adhesive 103 to a plastic support 104 that has a hollow opening supporting the encapsulated reed switch 105. A silicon rubber dipped coating is applied to the subassembly and an epoxy resin 106 holds and encapsulates the coated subassembly in the casing 100. The entire module is inserted in an opening in the floor with the upper end of the armature projecting beyond the casing into substantially flush relation with the floor surface and the leads extending laterally outwardly and connected to the conductor in a suitable manner. Grouting material is provided around the upper end of the armature.

The B module as shown in FIGS. 15 and 16 is substantially identical to the A module except that it includes a coil wound around the body 104 and associated electronic elements which are shown in schematic form in FIG. 17.

Referring to FIG. 18, the B module in addition to the normally closed contacts includes a holding circuit heretofore described by the designation M which comprises two parallel branches 110, 111 that have oppositely directed diodes 112, 113 and oppositely wound coils 114, 115 therein. Capacitors 16, 117 are provided in parallel with the coils 114, 15. By this arrangement, the AC current which is diverted into the branch of the B module when the contacts are opened is converted to a DC current that creates a constant magnetic field in the vicinity of the reed and maintains the contacts in open condition until the B module is reset by short circuiting across the contacts as occurs when an A module is subsequently momentarily closed.

The S module is substantially identical to the A module except that instead of a monostable reed 105, a bistable reed switch is provided.

GUIDE PATH CONTROL SYSTEM—MULTIPLE VEHICLES

Where multiple vehicles are used on a guide path such as shown in FIG. 1, it is essential to provide that one vehicle will not contact another, both in the normal movement along a single path and at the points of decision such as at the intersection I, diverging point II and converging point III.

Figure 7:
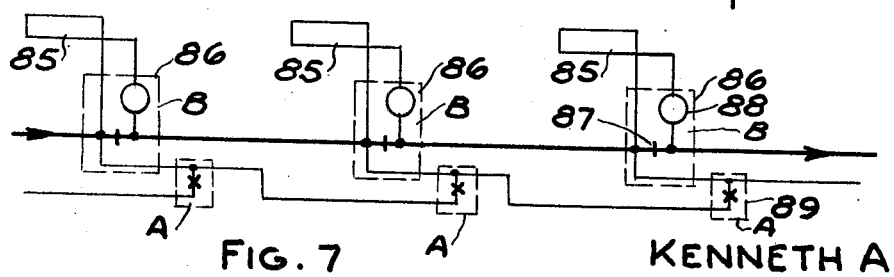
FIG. 7 is a schematic diagram of a portion of the guidance system shown in FIG. 1 wherein a plurality of vehicles are used.

In the movement of the vehicle along a single portion of the conductor, interference or contact between successive vehicles is eliminated by selectively energizing a holding coil or beacon 85 rearwardly of the vehicle to produce a signal that is sensed by the coil 33 on the vehicle to stop the vehicle, (FIG. 7). The coils 85 are selectively energized by bistable devices 86 of the type heretofore described which are electrically connected so that they normally permit current flow through the conductor path. However, as a vehicle passes each bistable device 86, the permanent magnet 31 on the vehicle momentarily interrupts the flow of current through the main conductor so that current will flow through the holding circuit 88 of the bistable device energizing the holding coil 85 rearwardly of the vehicle and in the path of the succeeding vehicle. As the preceding vehicle moves past the bistable device 86, the permanent magnet thereon momentarily completes a circuit to a monostable device 89 that is electrically connected to the succeeding bistable device 86 and momentarily shorts the holding circuit 88 thereof to de-energize the holding coil 85. The arrangement is such that one bistable device 86 is actuated to energize its respective coil 85 before the monostable device 89 is actuated to de-energize the previously energized holding coil 85a.

The manner in which such a blocking or stopping system is utilized at a point of intersection such as intersection II in FIG. 1 is shown schematically in FIG. 8 wherein the conventional wiring of FIG. 4 is enclosed in broken lines. Where a plurality of vehicles are used, in addition, bistable devices 86 that control holding coils 85 and are reset by monostable devices 89 are provided along the length of the intersecting guide path conductors. However, each bistable device 86 not only energizes its respective holding coil 85 but, in addition, energizes an additional holding coil 90 along the opposite path of the conductor so that a vehicle approaching along the intersecting path will be stopped until the first vehicle passes through. It should be noted that the holding coils 85 and 90 are schematically shown side by side for simplicity, but in actual installations may be laid one on top of another, or in the same slot in the floor, so that one sensor will sense either coil 85 or coil 90 or both when they are energized.

Similarly, as shown in FIG. 9, where multiple vehicles are used at the point of divergence, a bistable device 86 is provided on both the main and diverging paths for energizing holding coils 85 for interrupting the movement of a succeeding vehicle. As shown, appropriate holding coils 85 are provided for controlling the movement along the main path, the divergent path and the branch path so that it is not possible that one vehicle will overtake another.

As shown in FIG. 10, in the case of the converging point III in FIG. 1, the bistable devices 86 not only energize a holding coil 85 for stopping a succeeding vehicle but, in addition, energize a holding coil 91 along the converging path to interrupt a vehicle that may be coming along the converging path toward the point of intersection. In the system shown in FIG. 10, additional monostable devices 92, 93 are provided. A vehicle passing over device 92 will actuate B module 86–1. The vehicle, in turn, passes over device 93 and de-activates B module 86–2. This effectively transfers the hold command from 86–2 to 86–1 so that device 89–3 will reset the hold command 86–1 as the vehicle passes over 89–3. Also 89–3 will reset the holding of the intersection.

The manner in which the electrical connections are made in the area of the guide path between diverging point II and converging point III is shown in FIG. 11 wherein return paths 69a, 78a are provided between the portions 72a and 69 and the portions 78 and 72b, respectively. The cross hatching represents areas in which the current flow is in opposite directions so that there is no net signal which would interfere with steering.

It can be seen that in each of the path control connections that are made by the various monostable or bistable devices, a continuous circuit is maintained both in the main and what might be termed divergent or convergent branch paths. As a result, the uniform maintenance of current supply is substantially insured throughout the entire conductor.

Each of the monostable and bistable devices are inserted in the floor preferably in small capsules so that they can be actuated as desired by appropriate devices on the vehicle such as permanent or electromagnets.

Although the use of the modules has heretofore been described in connection with the control of the energization of one or two paths in a guide path, the modules may also be utilized to control more than two paths.

Control System—Summary

Figure 12:
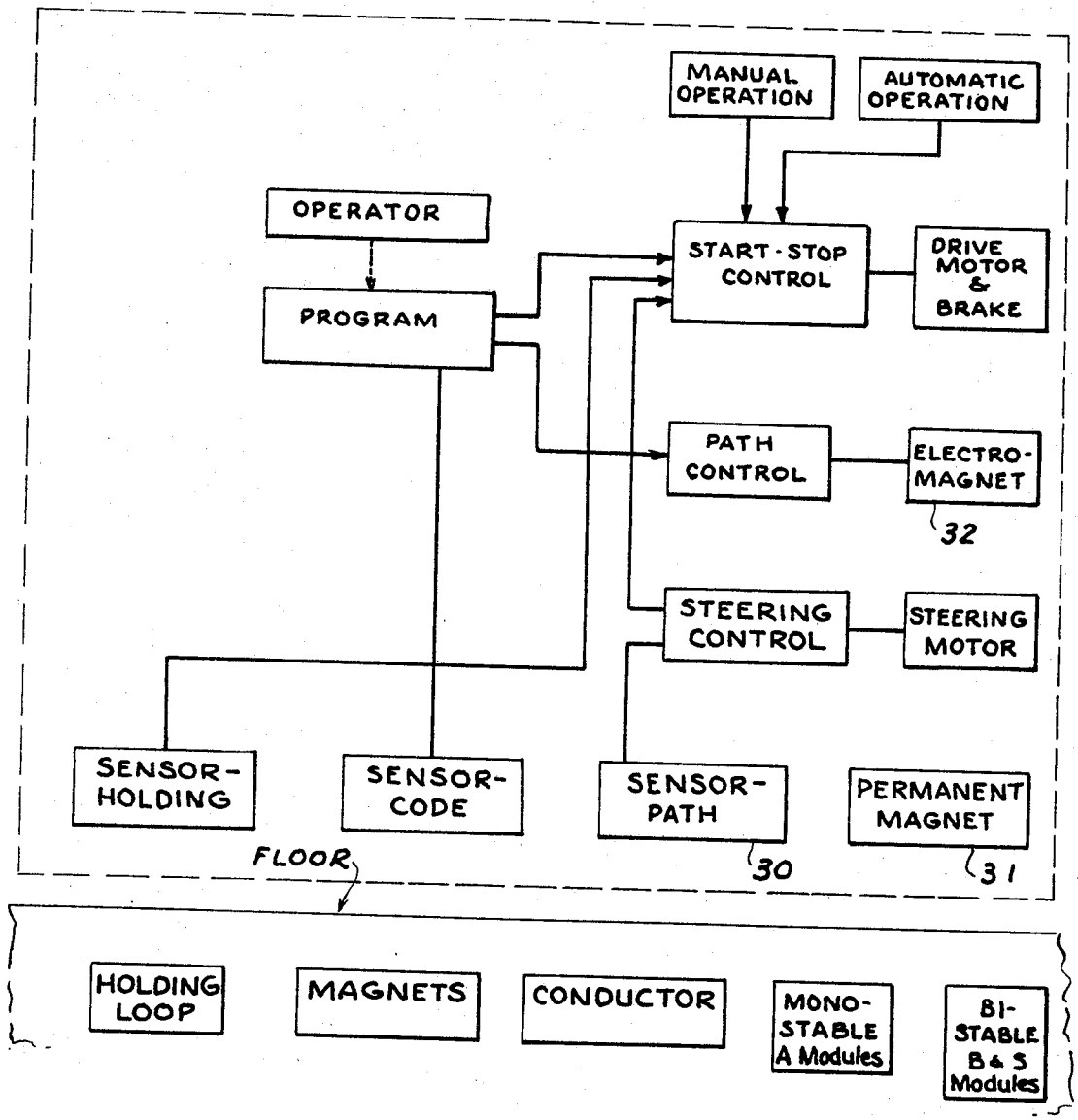
FIG. 12 is a block diagram of the control system.

Referring to FIG. 12 which is a schematic diagram of the interrelationship between the control system on the vehicle and the path control system along the path, the horizontal line represents the floor which has embedded therein a conductor heretofore described. The vehicle supports sensor means 30 in the form of coils which are utilized to actuate a steering control for operating a steering motor to steer the front wheel of the vehicle and follow the path.

The monostable and bistable modules A, B and S which control the selection of energization of portions of the guide path at the decision points and the holding loops which provide a signal for stopping the vehicle are provided in the floor.

The vehicle also supports permanent magnet 31 that actuates the monostable and bistable modules A and B and electromagnet 32 that actuates the bistable decision point module S and sometimes A. In addition, a sensor senses the energization of a holding coil to stop the vehicle.

Permanent magnet 31 is mounted along the centerline of the tractor and actuates all modules in line therewith of the A or B type. Electromagnet 32 is mounted a predetermined set distance from the centerline of the vehicle and actuates all modules in the floor a set distance from the centerline of the vehicle, the modules being of the S or A type.

As shown, the vehicle supports a program into which the operator sets a signal determining the destination of the vehicle. Into this program, a code sensor provides a signal depending upon the reading from signals along the floor. Specifically, magnets embedded in predetermined manner in predetermined locations in the floor produce signals that are read by a code sensor and compared in the programmer to produce a stop signal or a path control signal. The stop signal causes the drive motor to be de-energized and the brake to be energized. An appropriate path control signal selectively energizes the electromagnet 32 so that the proper decision will be made at any decision point, like diverging point II, to guide the vehicle through the shortest path. In the event that there is a failure of a reading signal sensing the guide path, for example, due to de-energization of the guide path, a stop signal is provided to the start-stop control for stopping the vehicle.

I claim:
1. In a guidance system, the combination comprising
   a guide path defining conductor in the floor connected in a single closed circuit,
   means for energizing said conductor,
   a vehicle having sensing means thereon for sensing said conductor and directing the vehicle along said conductor,
   the path defined by said conductor including portions wherein the conductor is angularly related to define an intersection or decision point,
   said conductor including a first conductor portion aligned with one path at said decision point,
   a second conductor portion aligned with another path at the decision point,
   interconnecting means electrically bridging said two portions,
   means for selectively connecting one of said first and second portions to the single closed circuit of said conductor so that said portions are selectively energized to complete said closed circuit,
   signal means on the vehicle,
   and means responsive to a signal from said signal means as the vehicle approaches said decision point to selectively energize one of said conductor portions.
2. The combination set forth in claim 1 wherein said decision point comprises diverging paths,
   said first and second conductor portions diverging along said paths.
3. The combination set forth in claim 1 wherein said last-mentioned means comprises switch means in the floor actuated by a signal from said signal means on the vehicle to selectively energize one of said conductor portions.
4. The combination set forth in claim 1 including means in the floor beyond said decision point and responsive to a signal from said vehicle for re-energizing the conductor portion which may have been de-energized and de-energizing the conductor portion that may have been energized in response to said first signal.
5. The combination set forth in claim 1 wherein said last-mentioned means comprises a bistable device in the floor connected to said conductor.
6. The combination set forth in claim 5 including a monostable device in the floor connected to said conductor beyond said decision point and adapted to be energized by a signal from the vehicle to return said bistable device to its original condition in the event that it has been changed to a second condition by said first mentioned signal.
7. The combination set forth in claim 5 wherein said bistable device includes switch means for interrupting the flow of current to one of said portions,
   a bypass circuit means for thereby providing current to the other of said portions,
   and a holding circuit energized by the current flowing through said last-mentioned portion for maintaining said switch means in said last-mentioned position.
8. The combination set forth in claim 7 including a monostable device beyond said decision point and adapted to be energized by a signal from the vehicle to short circuit said holding circuit and thereby return said bistable device to its original condition.

9. The combination set forth in claim 5 including a holding coil in the floor in advance of said bistable device,
a second bistable device in the floor in advance of said first mentioned bistable device,
said second bistable device being connected to said holding coil and adapted to be energized by a signal from the vehicle to energize said holding coil and thereby stop a succeeding vehicle.

10. The combination set forth in claim 9 including a monostable device in the floor beyond said first and second mentioned bistable devices and adapted to be energized by a signal from the vehicle to return said first mentioned bistable device to its original condition after the vehicle has passed said second mentioned bistable device.

11. The combination set forth in claim wherein said decision point comprises converging points,
said first and second conductor portions lying along said paths,
a bistable device in the floor in advance of said decision point,
said bistable device including switch means for interrupting the flow of current to one of said portions,
bypass circuit means for thereby providing current to the other of said portions,
and a holding circuit energized by the current flowing through said last-mentioned portion for maintaining said switch means in said last-mentioned position,
and a monostable device in the floor beyond said decision point and adapted to be energized by a signal from the vehicle to short circuit said holding circuit and thereby return said bistable device to its original position.

12. The combination set forth in claim 11 including a holding coil in the floor in advance of said bistable device,
a second bistable device in the floor in advance of said first mentioned bistable device,
said second bistable device being connected to said holding coil and adapted to be energized by a signal from the vehicle to energize said holding coil and thereby stop a succeeding vehicle.

13. The combination set forth in claim 12 including a monostable device in the floor beyond said second mentioned bistable device and adapted to be energized by a signal from the vehicle to return said first mentioned bistable device to its original condition after the vehicle has passed said second mentioned bistable device.

14. The combination set forth in claim 1 wherein said decision point comprises crossing guide paths of said conductor,
said first portion of said conductor lying along one of said paths,
said second portion of said conductor being spaced from and extending generally parallel to said one path beyond said decision point,
said last mentioned means comprising a bistable device in the floor in advance of said decision point,
said bistable device including switch means for interrupting the flow of current to one of said portions,
a bypass circuit means for thereby providing current to the other of said portions,
and a holding circuit energized by the current flowing through said last-mentioned portion for maintaining said switch means in said last-mentioned position,
and a monostable device in the floor beyond said decision point and adapted to be energized by a signal from the vehicle to short circuit said holding circuit and thereby return said bistable device to its original position.

15. The combination set forth in claim 14 including a holding coil in the floor in advance of said bistable device,
a second bistable device in the floor in advance of said first mentioned bistable device,
said second bistable device being connected to said holding coil and adapted to be energized by a signal from the vehicle to energize said holding coil and thereby stop a succeeding vehicle.

16. The combination set forth in claim 15 including a monostable device in the floor beyond said second mentioned bistable device and adapted to be energized by a signal from the vehicle to return said first mentioned bistable device to its original condition after the vehicle has passed said second mentioned bistable device.

17. The combination set forth in claim 1 wherein said decision point comprises diverging paths with said first and second conductor portions lying along said diverging paths,
said last mentioned means comprising a bistable device in said floor in advance of said decision point,
said device comprising a two-position reed switch.

18. The combination set forth in claim 17 including a holding coil in the floor in advance of said bistable device,
a second bistable device in the floor in advance of said first mentioned bistable device,
said second bistable device being connected to said holding coil and adapted to be energized by a signal from the vehicle to energize said holding coil and thereby stop a succeeding vehicle.

19. The combination set forth in claim 18 including a monostable device in the floor beyond said second mentioned bistable device and adapted to be energized by a signal from the vehicle to return said second mentioned bistable device to its original condition after the vehicle has passed said second mentioned bistable device.

20. The combination set forth in claim 1 including a holding coil in the floor in advance of said decision point,
and means responsive to a signal from said vehicle as said vehicle approaches said decision point to energize said holding coil and thereby stop a following vehicle.

21. In a guidance system, the combination comprising a guide path defining conductor connected in a single closed circuit,
means for energizing said conductor,
a vehicle having sensing means thereon for sensing said conductor and directing the vehicle along said conductor,
the path defined by said conductor including portions wherein the conductor is angularly related to define a decision point,
said conductor including a first portion aligned with one path at said decision point,
a second conductor portion aligned with another path at the decision point,
and interconnecting conductors bridging said two points,
bistable switch means in the floor in advance of the decision point for selectively energizing said first and second portions to connect one of said portions and complete said single closed circuit,
said bistable device including switch means for interrupting the flow of current to one of said portions,
a bypass circuit means for thereby providing current to the other of said portions and a holding circuit energized by the current flowing through said last-mentioned portion for maintaining said switch means in said last-mentioned position,
signal means on the vehicle,
said bistable switch means being responsive to a signal from said signal means as the vehicle approaches said decision point to selectively actuate said bistable switch means to energize one of said portions.

22. The combination set forth in claim 21 including monostable switch means in the floor beyond said decision point and adapted to be energized by a signal from the vehicle to return said bistable means to its original condition in the event that it has been changed to a second condition.

23. The combination set forth in claim 22 including a holding coil in the floor in advance of said bistable device,
a second bistable device in the floor in advance of said first mentioned bistable device,
said second bistable device being connected to said holding coil and adapted to be energized by a signal from the vehicle to energize said holding coil and thereby stop a succeeding vehicle.

24. The combination set forth in claim 23 including a monostable device in the floor beyond said second mentioned bistable device and adapted to be energized by a signal from the vehicle to return said first mentioned bistable device to its original condition after the vehicle has passed said second mentioned bistable device.

25. In a guidance system, the combination comprising
a guide path defining conductor in the floor connected in a single closed circuit,
constant current oscillator means for energizing said conductor so that a vehicle having sensing means thereon for sensing said conductor may direct the vehicle along said conductor,
the path defined by said conductor including a plurality of portions wherein the conductor is angularly related to define a plurality of decision points,
said conductor including a first portion aligned with one path at each said decision point,
and a second portion aligned with another path at said decision point,
and interconnecting conductors bridging said two portions,
means for selectively connecting one of said first and second portions to the single closed circuit of said conductor so that said portions are selectively energized to complete said closed circuit,
and means in the floor responsive to a signal from a vehicle as the vehicle approaches a decision point to selectively energize one of said portions.

26. The combination set forth in claim 25 wherein said bistable device includes switch means for interrupting the flow of current to one of said portions and bypass circuit means for thereby providing current to the other of said portions.

27. The combination set forth in claim 26 including a holding circuit energized by a vehicle for interrupting a succeeding vehicle.

28. The combination set forth in claim 27 wherein said holding circuit comprises a holding coil in the floor in advance of said bistable device,
a second bistable device in the floor in advance of said first mentioned bistable device,
said second bistable device being connected to said holding coil and adapted to be energized by a signal from the vehicle to energize said holding coil and thereby stop a succeeding vehicle.

29. The combination set forth in claim 28 including a monostable device in the floor beyond said decision point and responsive to a signal from said vehicle for de-energizing said holding circuit.

30. In a guidance system, the combination comprising
a guide path defining conductor in the floor connected in a closed circuit,
means for energizing said conductor,
a vehicle having sensing means thereon for sensing said conductor and directing the vehicle along said conductor,
the path defined by said conductor including portions wherein the conductor is angularly related to define an intersection or decision point,
said conductor including a first conductor portion aligned with one path at said decision point,
a second conductor portion aligned with another path at the decision point,
interconnecting means electrically bridging said two portions,
means for selectively connecting one of said first and second portions to the circuit of said conductor so that said portions are selectively energized,
signal means on the vehicle,
and means responsive to a signal from said signal means as the vehicle approaches said decision point to selectively energize one of said conductor portions,
said last-mentioned means comprising a bistable device in the floor connected to said conductor,
a monostable device in the floor connected to said conductor beyond said decision point and adapted to be energized by a signal from the vehicle to return said bistable device to its original condition in the event that it has been changed to a second condition by said first mentioned signal,
said monostable device comprising a casing,
an armature having an end thereof exposed whereby when said casing is placed in the floor, the end of said armature extends and faces upwardly,
a monostable reed switch positioned beneath said armature and connected to said conductor,
and encapsulating material surrounding said armature and said reed switch and filling said casing.

31. In a guidance system, the combination comprising
a guide path defining conductor in the floor connected in a closed circuit,
means for energizing said conductor,
a vehicle having sensing means thereon for sensing said conductor and directing the vehicle along said conductor,
the path defined by said conductor including portions wherein the conductor is angularly related to define an intersection or decision point,
said conductor including a first conductor portion aligned with one path at said decision point,
a second conductor portion aligned with another path at the decision point,
interconnecting means electrically bridging said two portions,
means for selectively connecting one of said first and second portions to the circuit of said conductor so that said portions are selectively energized,
signal means on the vehicle,
and means responsive to a signal from said signal means as the vehicle approaches said decision point to selectively energize one of said conductor portions,
said last-mentioned means comprising a bistable device in the floor connected to said conductor,
said bistable device in the floor comprising a casing,
an armature having an end thereof exposed whereby when said casing is placed in the floor, the end of said armature extends and faces upwardly,
a normally closed monostable reed switch positioned beneath said armature and connected to said conductor,
a holding circuit energized by opening of said contacts of said reed switch to maintain said contacts in open position,
and encapsulating material surrounding said armature and said reed switch and filling said casing.

32. The combination set forth in claim 31 wherein said holding circuit comprises parallel paths,
each said path including a diode and a coil and a capacitance in parallel with the coil,
said diodes being oppositely disposed and said coils being oppositely wound.

33. In a guidance system, the combination comprising
a guide path defining conductor in the floor connected in a closed circuit,
means for energizing said conductor,
a vehicle having sensing means thereon for sensing said conductor and directing the vehicle along said conductor,
the path defined by said conductor including portions wherein the conductor is angularly related to define an intersection or decision point, said conductor including a first conductor portion aligned with one path at said decision point,
a second conductor portion aligned with another path at the decision point,
interconnecting means electrically bridging said two portions,
means for selectively connecting one of said first and second portions to the circuit of said conductor so that said portions are selectively energized,
signal means on the vehicle,
and means responsive to a signal from said signal means as the vehicle approaches said decision point to selectively energize one of said conductor portions,
said last-mentioned means comprising a bistable device in the floor connected to said conductor,
said bistable device comprising a casing in the floor,
an armature having an end thereof exposed whereby when said casing is placed in the floor, the end of said armature extends and faces upwardly,
and encapsulating material surrounding said armature and said reed switch and filling said casing,
and a bistable reed switch positioned beneath said armature and connected to said conductor.

References Cited

UNITED STATES PATENTS

| | | | |
|---|---|---|---|
| 3,038,970 | 6/1962 | Paluka | 180—98 X |
| 3,039,554 | 6/1962 | Hosking et al. | 180—79.1 X |
| 3,074,353 | 1/1963 | Devonshire et al. | 246—249 X |
| 3,143,976 | 8/1964 | Wherry | 246—254 X |
| 3,147,817 | 9/1964 | DeLiban | 180—98 |
| 3,168,269 | 2/1965 | Fisher | 246—249 |
| 3,245,493 | 4/1966 | Barrett | 180—98 |
| 3,411,603 | 11/1968 | Kohls | 180—82 |

KENNETH H. BETTS, Primary Examiner

U.S. Cl. X.R.

246—249; 335—205